United States Patent
Mimura et al.

Patent Number: 5,406,076
Date of Patent: Apr. 11, 1995

[54] JOY STICK MECHANISM FOR OPHTHALMIC APPARATUS

[75] Inventors: Yoshiaki Mimura, Gamagori; Tomohito Ishikawa, Sendai; Naoki Isogai, Nishio; Hirohisa Terabe, Toyokawa, all of Japan

[73] Assignee: Nidek Co., Ltd., Aichi, Japan

[21] Appl. No.: 52,916

[22] Filed: Apr. 27, 1993

[30] Foreign Application Priority Data

Apr. 30, 1992 [JP] Japan .................................. 4-140174
Oct. 30, 1992 [JP] Japan .................................. 4-316409

[51] Int. Cl.⁶ .............................................. G01D 5/34
[52] U.S. Cl. ................................ 250/229; 250/231.16
[58] Field of Search ............ 250/221, 229, 231.13, 250/231.16, 214 PR; 341/31; 200/6 A; 74/471

[56] References Cited

U.S. PATENT DOCUMENTS

| | | | |
|---|---|---|---|
| 4,382,166 | 5/1983 | Kim | 200/6 |
| 4,489,303 | 12/1984 | Martin | 338/128 |
| 4,533,827 | 8/1985 | Fincher | 250/211 |
| 4,584,510 | 4/1986 | Hollow | 318/584 |
| 4,616,115 | 10/1986 | Potyka | 200/153 |
| 4,706,006 | 11/1987 | Solomon | 250/221 |
| 4,716,399 | 12/1987 | Nordlund | 250/221 |
| 4,748,323 | 5/1988 | Holiday | 250/221 |
| 4,794,388 | 12/1988 | Matthews | 340/731 |
| 4,879,556 | 11/1989 | Duimel | 34/120 |
| 4,892,312 | 1/1990 | Minemoto et al. | 250/232.15 |
| 4,958,071 | 9/1990 | Scott-Jackson et al. | 250/231.16 |
| 5,008,534 | 4/1991 | Yonezawa et al. | 250/229 |
| 5,113,179 | 5/1992 | Scott-Jackson | 340/709 |

FOREIGN PATENT DOCUMENTS

| | | |
|---|---|---|
| 61-198322 | 9/1986 | Japan . |
| 2-88028 | 3/1990 | Japan . |
| 2-88029 | 3/1990 | Japan . |

Primary Examiner—David C. Nelms
Attorney, Agent, or Firm—Nikaido Marmelstein Murray & Oram

[57] ABSTRACT

A joy stick mechanism for an ophthalmic apparatus moving an optical device of the ophthalmic apparatus horizontally and vertically, which mechanism is simple in structure but excellent in operational efficiency. Therefore, this mechanism comprises a drive device for moving the optical device vertically, a rotating knob rotatably provided on a shaft which substantially extends through a central portion of the mechanism, a detection device for detecting a direction and an amount of rotation of the rotating knob, and a control device for controlling the drive device on the basis of detection results of the detection device.

9 Claims, 4 Drawing Sheets

AT THE TIME OF NORMAL ROTATION

AT THE TIME OF REVERSE ROTATION

JOY STICK MECHANISM FOR OPHTHALMIC APPARATUS

BACKGROUND OF THE INVENTION

1. Industrial Field of the Invention

The present invention relates to a joy stick mechanism for an ophthalmic apparatus moving the optical apparatus on a fixed mount vertically and horizontally, to thereby position it with respect to an eye to be examined.

2. Description of the Prior Art

An ophthalmic apparatus, such as a fundus camera, is provided with a mechanism for positioning an optical system of the apparatus with respect to an eye to be examined. As this positioning mechanism, there has been known a sliding mechanism whereby a carrier on which the optical system of the apparatus is mounted is slid on a fixed mount when an operation stick or a joy stick is operated.

As this joy stick, there has also been known a joy stick with a mechanism whereby the outer periphery of the joy stick is rotated to move the optical system vertically. In such an apparatus, rotational movement of the joy stick is transmitted to the vertical movement mechanism through a combination of a belt and gears, and so forth.

Further, there has been known a switch mechanism provided on the top of a joy stick use it as a switch for photographing and measurement.

The applicant of the present application suggested, in Japanese Patent Examined Publication No. 3-1689 'Joy Stick Mechanism', an apparatus including a shaft which is located on the axis of a joy stick and which can be rotated and inclined (turned), a rotating knob attached on an upper outer-peripheral portion of the shaft, an operation button provided on the top of the rotating knob, a turning knob which is attached on the outer periphery of a lower portion of the rotating knob and which is prevented from rotating, and a switch provided inside of the turning knob, wherein the operation button is provided with a connecting rod which has a ring-like plate to be connected to the switch.

However, the conventional joy stick involves a problem that the structure is extremely complicated and a problem that location of the joy stick is restricted. Moreover, in order to transmit rotation of the joy stick to a vertical movement mechanism, a space for installing gears and a belt is required, which results in another problem that the apparatus is increased in size.

Furthermore, in the case of the apparatus with an operational mechanism for moving the optical system vertically, which is provided independently from the joy stick, it is necessary to release the hand of an operator from the joy stick so as to operate this operational mechanism. Thus, the operational efficiency is extremely deteriorated. Besides, in the case of an apparatus which requires strictly accurate positioning, it involves a problem that the operation is difficult.

SUMMARY OF THE INVENTION

Taking the problems of the conventional apparatus into consideration, it is an object of the present invention to provide a joy stick mechanism for an ophthalmic apparatus which is simple in structure but excellent in operational efficiency.

In order to achieve this object, the invention has the following characteristics.

A joy stick mechanism for an ophthalmic apparatus moving an optical device of the ophthalmic apparatus horizontally and vertically is characterized in that it comprises drive means for moving the optical device vertically, a rotating knob rotatably provided on a shaft which substantially extends through a central portion of the mechanism, detection means for detecting a direction and an amount of rotation of the rotating knob, and control means for controlling the drive means on the basis of detection results of the detection means.

In the above-described joy stick mechanism, rotation stopping means may be provided on the shaft which substantially extends through the central portion of the mechanism, at at least one position on the horizontal plane including the turning center point, so as to prevent the shaft from rotating.

Also, the detection means may further include a slit plate which is rotated with the rotating knob, and measuring light beam sources and light receiving elements which are provided on the shaft on opposite sides of the slit plate.

Further, the control means may be provided independently from control means for a main body of the optical device.

In the above-described joy stick mechanism for the ophthalmic apparatus, an operation button for producing trigger signals may be provided on the top of the rotating knob, and a switch which is operated by the operation button may be further provided on the shaft or a turning knob connected to the shaft.

Another joy stick mechanism for an ophthalmic apparatus moving an optical device of the ophthalmic apparatus horizontally and vertically has a structure comprising drive means for moving the optical device vertically, a rotating roller provided on an upper portion of a joy stick, detection means for detecting a direction and an amount of rotation of the rotating roller, and control means for controlling the drive means on the basis of detection results of the detection means.

The detection means include a slit plate which is interlocked with the rotating roller and rotated, and measuring light beam sources and light receiving elements which are provided on opposite sides of the slit plate.

Moreover, in the above-described mechanism, the control means may be provided independently from control means for a main body of the optical device.

Furthermore, in this joy stick mechanism for the ophthalmic apparatus, an operation button for operating a trigger switch may be provided on a lower portion of an operation stick on the side of an examinee at the time of alignment operation.

DETAILED DESCRIPTION OF THE PREFERRED EMBODIMENTS

Figure 1:
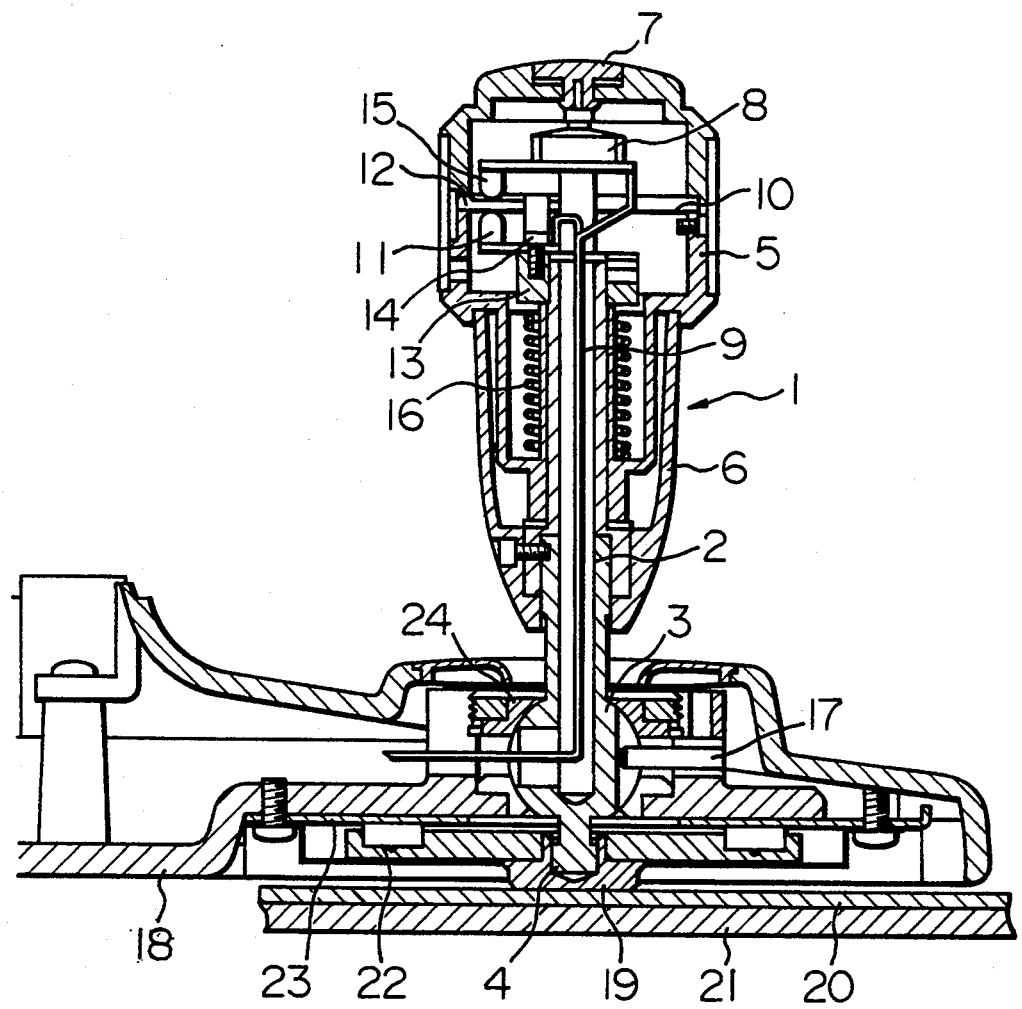
FIG. 1 is a cross-sectional view for explaining a first embodiment of a joy stick mechanism according to the invention.

The present invention will be hereinafter described on the basis of the preferred embodiments illustrated in the attached drawings. FIG. 1 is a cross-sectional view showing a first embodiment of a joy stick mechanism according to the invention.

A joy stick 1 has a shaft 2 extending through the joy stick 1. A spherical portion 3 and a spherical portion 4 having a substantially spherical shape are formed on a lower portion of the shaft 2. A rotating knob 5 is provided rotatably with respect to the shaft 2. A turning knob 6 for turning the joy stick is securely fixed on the shaft 2. An operation button 7 is located on the top of the rotating knob 5. A switch 8 is fixed on the turning knob 6. When the operation button 7 is pressed down, the switch 8 is operated to transmit the signal to an apparatus control circuit (to be described later) through an electric wire 9, thereby starting treatment, photographing, measurement and so forth.

A disk 10 having a plurality of slits is secured on the rotating knob 5. When the rotating knob is rotated, the disk 10 (FIG. 2A) is simultaneously rotated. LED's 11 are fixed on the shaft 2. A mask 12 (FIG. 2B) having two slits is fixed on the shaft 2 through a nut 13 and a protrusion 14. Phototransistors 5 are secured on the shaft 2 through the nut 13. Rotation of the disk 10 causes a light beam of the LED 11 passing through the mask 12 to be irradiated intermittently on the phototransistor 15. A signal of the phototransistor 15 is transmitted to control circuit for vertical movement mechanism (to be described later). A spring 16 is provided for adjusting the torque of the rotating knob 5.

A pin 17 is securely fixed on a base 18 so as to extend horizontally toward the turning center of the shaft 2, with an optical device being mounted on the base 18 through a vertical movement mechanism (not specifically shown). The pin 17 is closely fitted in a groove at the lower end of the shaft 2, thereby preventing the shaft 2 and the turning knob 6 from rotating.

The base 18 can be moved horizontally on a friction board 20 through a sliding board 19. The friction board 20 is adhered on a fixed mount 21. A sliding plate 22 is embedded in the sliding board 19, and a plate 23 is secured on the base 18. By turning the turning knob 6, the shaft 2 is turned around the center of the spherical portion 3 through a ball bearing 24, so that the lower end of the shaft 2 will swing the sliding board 19. Materials are selected in such a manner that a frictional force between the sliding board 19 and the friction board 20 is stronger than that between the plate 23 and the sliding plate 22. Thus, when the lower end of the shaft 2 swings the sliding board 19, the sliding board 19 will not move, but the base 18 is slid horizontally on the sliding plate 22 through the plate 23, thereby realizing fine horizontal movement.

Figure 3:
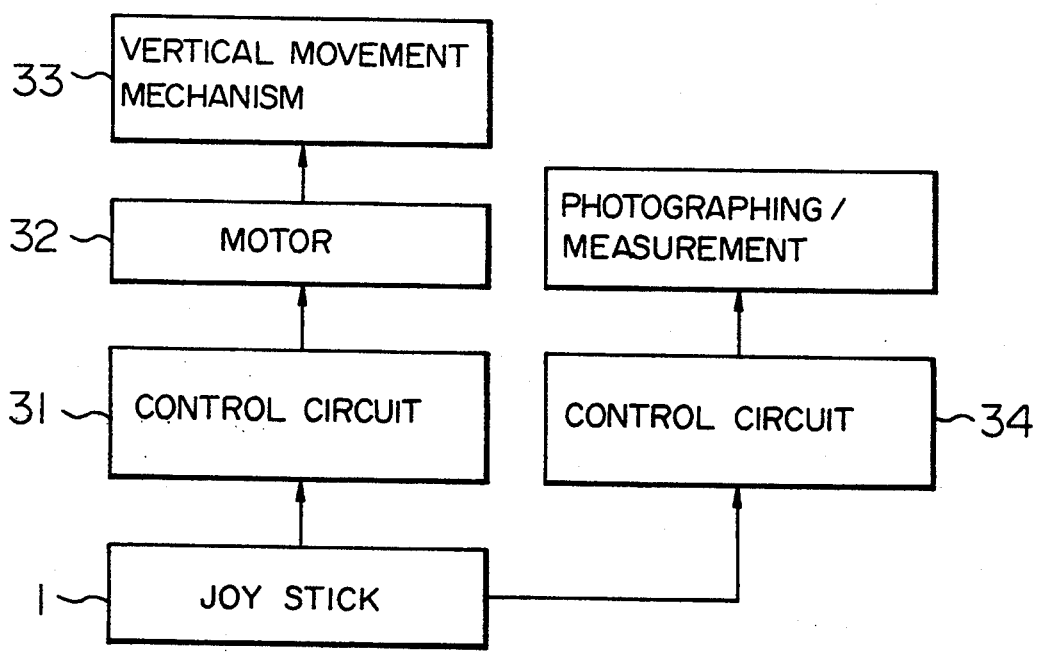
FIG. 3 is a block diagram for explaining the operation by operating the joy stick in FIG. 1.

In the first embodiment described above, the operation by operating the joy stick will now be described. FIG. 3 is a block diagram for explaining the operation by operating the joy stick in FIG. 1.

Figure 2A:
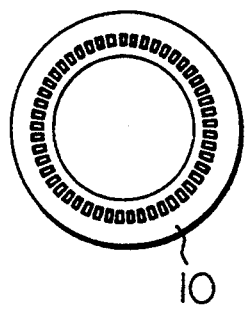
FIGS. 2A and 2B are diagrams showing the structures of a disk and a mask in the first embodiment, respectively.
Figure 2B:
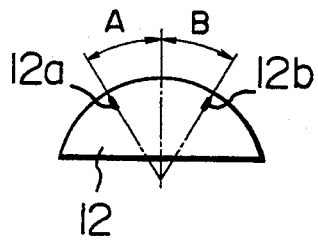

When the rotating knob 5 is rotated, the disk 10 securely fixed on the rotating knob 5 is also rotated simultaneously. By the rotation of the disk 10 the light beam of the LED 11 passing through the mask 12 is irradiated intermittently on the phototransistor 15. The structures of the disk 10 and the mask 12 are illustrated in FIGS. 2A and 2B. Two LED's 11 and two phototransistors 15 are located on opposite sides of the disk 10 and the mask 12, so that two pairs of them are totally provided. The two pairs are located at positions corresponding to the respective slits 12a and 12b of the mask 12. The two slits 12a and 12b of the mask 12 are arranged in such a manner that output waveforms of the phototransistors 15a and 15b corresponding to the respective slits will be half-cycle displaced from each other. The output waveforms of the phototransistors 15a and 15b in this case are shown in FIG. 4. On the basis of these output waveforms, a detection circuit 30 detects a direction and an amount of rotation of the rotating knob 5.

Figure 4A:
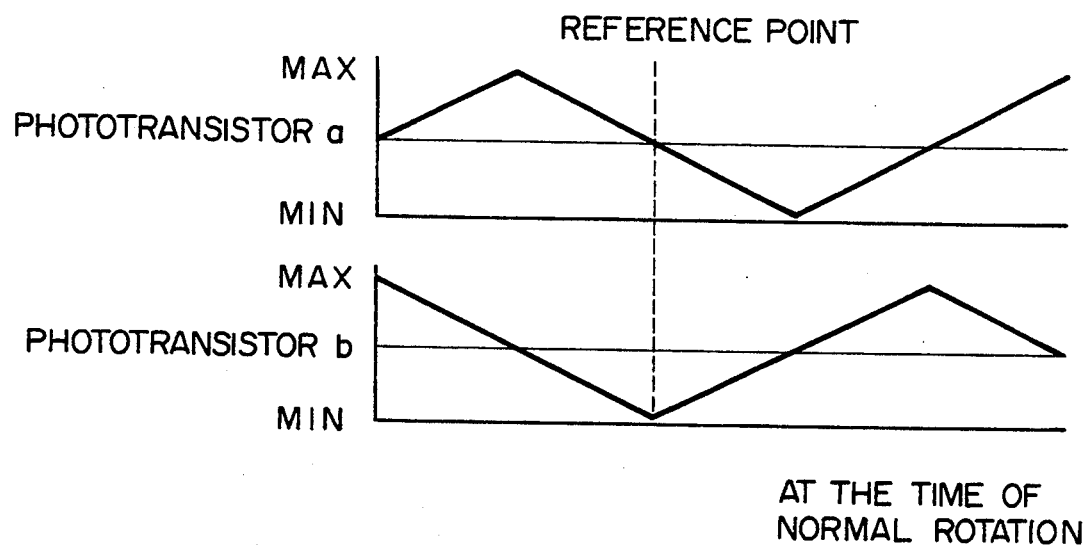
FIGS. 4A and 4B are charts showing output waveforms of phototransistors in FIG. 1.
Figure 4B:
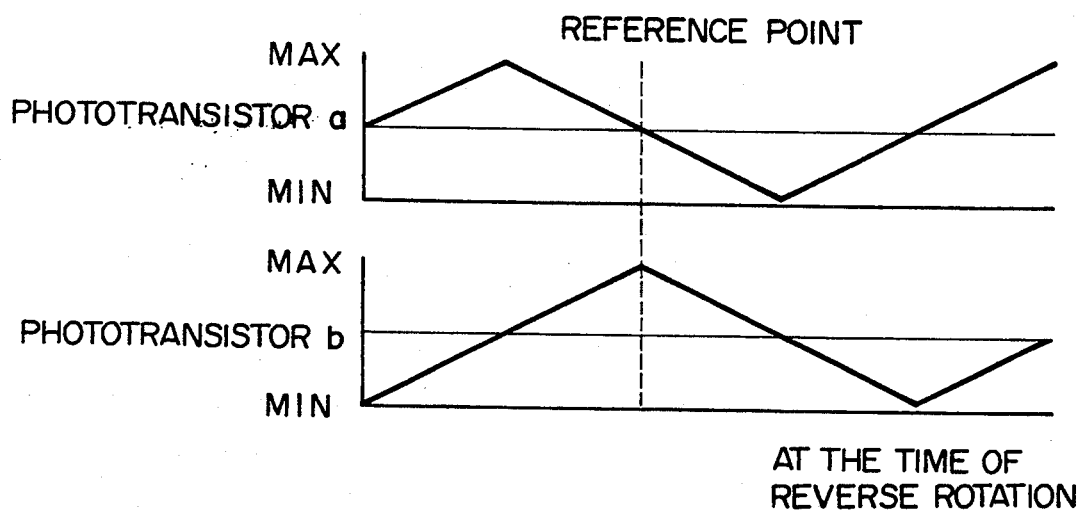

The direction of rotation of the rotating knob 5 can be detected by detecting an output condition of the phototransistor 15b (or 15a) at a predetermined reference point with respect to a waveform of the phototransistor 15a (or 15b) at the reference point. In the case where reference points are set as shown in FIGS. 4A and 4B, it is judged as normal rotation when the output of the phototransistor 15b at the reference point is the minimum value, as shown in FIG. 4A, and it is judged as reverse rotation when the output of the phototransistor 15b at the reference point is the maximum value, as shown in FIG. 4B.

Further, on the basis of the output of the phototransistor 15a (or 15b), the amount of rotation of the rotating knob 5 is detected by counting the number of waveforms from one reference point in a predetermined period of time.

A control circuit 31 drives a motor 32 with a voltage corresponding to the direction and amount of rotation detected by the detection circuit, thereby operating the vertical movement mechanism 33.

When the operation button 7 on the top of the joy stick is pressed down, the switch 8 fixed on the turning knob 6 is operated to transmit the signal to the apparatus control circuit 34 through the electric wire 9, thereby starting treatment, photographing, measurement and so forth.

Figure 5:
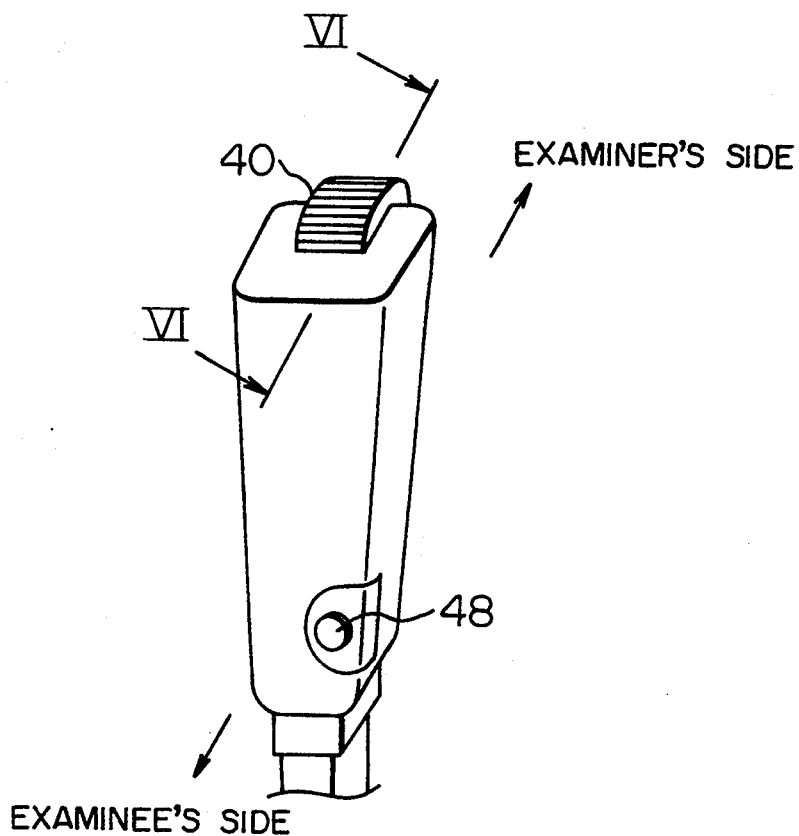
FIG. 5 is a diagram showing an outer appearance of an operation stick in a second embodiment of a joy stick mechanism according to the invention.
Figure 6:
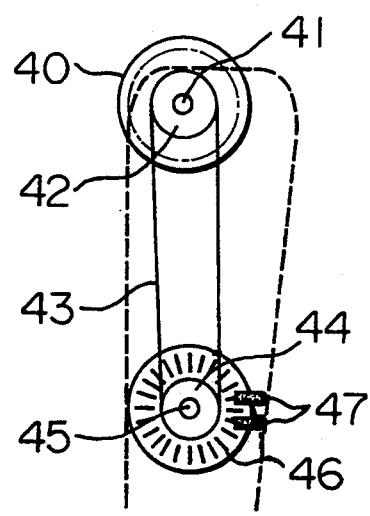
FIG. 6 is a simplified cross-sectional view, taken along the line VI—VI of FIG. 5, as viewed in the direction indicated by the arrows.

FIG. 5 is a diagram showing an outer appearance of an operation stick in a second embodiment of a joy stick mechanism according to the invention, and FIG. 6 is a simplified cross-sectional view, taken along the line VI—VI of FIG. 5, as viewed in the direction indicated by the arrows. The second embodiment includes a mechanism for fine movement on a horizontal plane which has substantially the same structure as that of the first embodiment, and it is merely simpler than the first embodiment in that a part of the operation stick is not rotated, so that its explanation will be omitted.

A rotating roller 40 has a structure in which one portion of the outer periphery is projected from an upper-end corner portion of the operation stick so that it can be easily rotated by the thumb of an operator. The rotating roller 40 is rotated about a shaft 41. Rotation of the shaft 41 is transmitted to a shaft 45 via a pulley 42, a belt 43 (or a wire) and a pulley 44. A disk 46 formed with slits is rotated with the shaft 45. Rotation of the disk 46 is detected by a mask (not shown), LED's (not shown) and phototransistors 47 in substantially the same manner as the first embodiment. An amount and a direction of rotation of the rotating roller 40 are detected by processing signals from the two phototransistors 47.

An operation button 48 is provided at a position on an extension of the third or fourth finger of an operator when the operator holds the grip, so that the operator will not press the operation button in error during operation of the joy stick.

In either of the above-described embodiments, the apparatus is mechanically slid on a horizontal plane forwardly and backwardly and to the left and right by moving the joy stick. However, the joy stick portion and the sliding portion (the main body) may be separated from each other to use the joy stick like a mouse of a computer, so that the operation of the joy stick is detected, and that results of the detection including the start signal will be transmitted to the main body by radio, wire or optical communication.

Needless to say, these embodiments can be modified easily by a manufacturer concerned, and embodiments of the present invention are not limited to the above-described ones.

What is claimed is:

1. A joy stick mechanism for an ophthalmic apparatus moving an optical device of the ophthalmic apparatus horizontally and vertically, comprising:
    a handheld stick having a shaft which substantially extends through a central portion, said handheld stick being provided on an upper portion with a rotating knob rotating around an axis of said shaft, and on a lower portion with a spherical portion supported by a ball bearing;
    horizontal drive means for moving a base mounting the ophthalmic apparatus against a fixed mount by moving said handheld stick horizontally and inclining said handheld stick around said spherical portion;
    detecting means for detecting a direction and an amount of rotation of said rotating knob;
    drive means for moving said optical device vertically; and
    control means for controlling said drive means on the basis of detection results of said detection means.

2. A joy stick mechanism for an ophthalmic apparatus according to claim 1, wherein rotation stopping means are provided on said shaft which substantially extends through the central portion of the mechanism, at at least one position on the horizontal plane including the turning center point, so as to prevent the shaft from rotating.

3. A joy stick mechanism for an ophthalmic apparatus according to claim 1, wherein said detection means include a slit plate which is rotated with said rotating knob, and measuring light beam sources and light receiving elements which are provided on said shaft on opposite sides of said slit plate.

4. A joy stick mechanism for an ophthalmic apparatus according to claim 1, wherein said control means are provided independently from a control means for a main body of the optical device.

5. A joy stick mechanism for an ophthalmic apparatus according to claim 1, wherein an operation button for producing trigger signals is provided on the top of said rotating knob, and a switch which is operated by said operation button is provided on said shaft or a said rotating knob connected to said shaft.

6. A joy stick mechanism for an ophthalmic apparatus moving an optical device of the ophthalmic apparatus horizontally and vertically, comprising:
    a handheld stick having shaft which substantially extends through a central portion, said handheld stick being provided on an upper portion of a joy stick with a rotating roller, and on a lower portion with a spherical portion supported by a ball bearing;
    horizontal drive means for moving a base mounting the ophthalmic apparatus against a fixed mount by moving said handheld stick horizontally and inclining said handheld stick around said spherical portion;
    detection means for detecting a direction and an amount of rotation of said rotating roller;
    drive means for moving said optical device vertically; and
    control means for controlling said drive means on the basis of detection results of said detection means.

7. A joy stick mechanism for an ophthalmic apparatus according to claim 6, wherein said detection means include a slit plate which is interlocked with said rotating roller and rotated therewith, and measuring light beam sources and light receiving elements which are provided on opposite sides of said slit plate.

8. A joy stick mechanism for an ophthalmic apparatus according to claim 6, wherein said control means are provided independently from a control means for a main body of the optical device.

9. A joy stick mechanism for an ophthalmic apparatus according to claim 6, wherein an operation button for operating a trigger switch is provided on a lower portion of an operation stick on the side of an examinee at the time of alignment operation.

* * * * *